US011772132B2

(12) United States Patent
Fuhrmann et al.

(10) Patent No.: US 11,772,132 B2
(45) Date of Patent: Oct. 3, 2023

(54) SEPARATING DEVICE OF AN OPTICAL TESTING UNIT

(71) Applicant: INTRAVIS GESELLSCHAFT FÜR LIEFERUNGEN UND LEISTUNGEN VON BILDGEBENDEN UND BILDVERARBEITENDEN ANLAGEN UND VERFAHREN MBH, Aachen (DE)

(72) Inventors: Gerd Fuhrmann, Aachen (DE); Klaus Schönhoff, Würselen (DE); Michael Rick, Aachen (DE)

(73) Assignee: INTRAVIS GESELLSCHAFT FÜR LIEFERUNGEN UND LEISTUNGEN VON BILDGEBENDEN UND BILDVERARBEITENDEN ANLAGEN UND VERFAHREN MBH, Aachen (DE)

( * ) Notice: Subject to any disclaimer, the term of this patent is extended or adjusted under 35 U.S.C. 154(b) by 374 days.

(21) Appl. No.: 17/295,641

(22) PCT Filed: Nov. 13, 2019

(86) PCT No.: PCT/EP2019/081192
§ 371 (c)(1),
(2) Date: May 20, 2021

(87) PCT Pub. No.: WO2020/104276
PCT Pub. Date: May 28, 2020

(65) Prior Publication Data
US 2022/0001423 A1 Jan. 6, 2022

(30) Foreign Application Priority Data
Nov. 23, 2018 (DE) ............... 10 2018 129 589.8

(51) Int. Cl.
*B07C 5/02* (2006.01)
*B07C 5/34* (2006.01)
(Continued)

(52) U.S. Cl.
CPC .............. *B07C 5/02* (2013.01); *B07C 5/3408* (2013.01); *B65G 47/28* (2013.01); *B65G 47/846* (2013.01)

(58) Field of Classification Search
CPC ......... B07C 5/02; B07C 5/3408; B65G 47/28; B65G 47/846; B65G 47/848; B65G 51/03
See application file for complete search history.

(56) References Cited

U.S. PATENT DOCUMENTS

| 2,606,657 | A | * | 8/1952 | Berthelsen | .............. B07C 5/124 |
| | | | | | 209/591 |
| 3,330,402 | A | * | 7/1967 | Schlueter | ................ B65B 35/46 |
| | | | | | 101/90 |
| 4,044,891 | A | | 8/1977 | Pynsky | |
| 4,273,235 | A | * | 6/1981 | Rustand | ................ B65G 47/82 |
| | | | | | 198/437 |

(Continued)

FOREIGN PATENT DOCUMENTS

| DE | 2913446 A1 | 10/1980 |
| DE | 3427379 A1 | 1/1986 |

(Continued)

OTHER PUBLICATIONS

English translation of the International Preliminary Report on Patentability (Chapter II) dated Feb. 25, 2021; 7 pages.

*Primary Examiner* — Mark A Deuble
(74) *Attorney, Agent, or Firm* — LUCAS & MERCANTI, LLP (57) ABSTRACT

A separating device of an optical testing unit for testing rotationally symmetrical test objects includes two corresponding pocket wheels, each having a plurality of pockets distributed uniformly over a circumference. The pocket wheels rotate synchronously in opposite directions about parallel axes in response to a drive. A continuous conveyor (Continued)

transports the test objects on a transporting plane. Depending on the geometry of the test objects, the distances between the respective pocket wheels and between the pocket wheels and the transporting plane are determined so that the test objects, which are fed via and accumulating section, are moved between the pocket wheels while being guided by two pockets of the two pocket wheels and are released by the two pockets downstream of an engagement section. Once released the test objects are accelerated to a higher transporting speed in an accelerating section of the continuous conveyor and are separated as a result.

18 Claims, 3 Drawing Sheets

(51) Int. Cl.
*B65G 47/28* (2006.01)
*B65G 47/84* (2006.01)

(56) References Cited

U.S. PATENT DOCUMENTS

| | | | |
|---|---|---|---|
| 4,274,532 A | 6/1981 | Johnson | |
| 4,274,533 A * | 6/1981 | Abe | B65G 47/681 |
| | | | 198/450 |
| 5,122,016 A | 6/1992 | Lenhart | |
| 8,182,629 B2 * | 5/2012 | Seifert | B65G 47/24 |
| | | | 156/212 |
| 9,809,396 B2 * | 11/2017 | Joehren | B65G 47/088 |
| 2009/0127071 A1 * | 5/2009 | Otruba | B65G 47/846 |
| | | | 198/459.2 |
| 2018/0100824 A1 | 4/2018 | Asselin | |

FOREIGN PATENT DOCUMENTS

| | | |
|---|---|---|
| DE | 10107004 A1 | 9/2002 |
| DE | 102013014473 A1 | 3/2015 |
| EP | 1867592 A1 | 12/2007 |
| JP | H0331114 A | 2/1991 |

* cited by examiner

SEPARATING DEVICE OF AN OPTICAL TESTING UNIT

CROSS-REFERENCE TO RELATED APPLICATIONS

This application is a 371 of PCT/EP2019/081192, filed Nov. 13, 2019, which in turn claims the priority of DE 10 2018 129 589.8 filed Nov. 23, 2018. The priority of both applications is hereby claimed and both applications are incorporated herein by reference.

BACKGROUND OF THE INVENTION

The invention relates to a separating device of a testing unit for the non-destructive physical, in particular optical or electrical, testing of corresponding test objects that are rotationally symmetrical with respect to an object axis, having a bottom surface, a top surface, and a lateral surface extending between the bottom surface and the top surface.

The test objects are, for example, container closures with a closed bottom surface opposite an open top surface. However, it is also possible to separate test objects on which the top and/or bottom surfaces are optionally completely or partially open or closed. In order to ensure the quality of the container closures produced in bulk, it is known from the prior art to continuously examine at least one test criterion of the test objects produced with the aid of optical testing units. The test criteria are selected in such a way that typical properties and/or defects of the test object can be detected during inspection. Typical defects of injection-molded hollow bodies are dimensional defects, material defects and color defects.

Digital still image cameras are used to optically test the test objects for such defects, the cameras taking images of the separated test objects, which are then evaluated in an evaluation unit. To record the images, prior separation of the test objects, which are conveyed in a single-row, closed transport stream, is required. The accumulation section for the test objects, which is upstream of the separation, serves to equalize the transport flow of the test objects in terms of quantity and time.

DE 10 2013 014 473 A1 discloses a testing unit for the optical testing of rotationally symmetrical vessels, in which the vessels are actively transported through the testing unit on two parallel conveyor belts running at the same speed. This ensures that the relative position of a vessel on the conveyor belts does not change as long as there is static friction between the vessel and the conveyor belts. Above the conveyor belts, a star wheel with a plurality of fingers is arranged so as to be rotatable by means of a drive. The fingers of the star wheel enter the vessel via the open top surface opposite the bottom surface. By regulating the rotational speed of the star wheel relative to the feed speed of the two conveyor belts, it is possible to produce a gap of variable size between the vessels on the two conveyor belts downstream of the star wheel, i.e. to separate the test objects.

The fingers of the star wheel which enter the vessels from above can damage the vessel in the upper, less robust region. When container closures are separated by means of the star wheel, the sensitive guarantee strip, for example, may be damaged by the fingers of the star wheel. The finger entering the container closure may get caught in the toothing of the guarantee strip, which results in a build up of the container closures upstream of the star wheel or their nonuniform position on the conveyor belts. There are furthermore container closures with an integrally formed, raised guarantee strip. Since important test criteria of the container closure in the testing unit are only accessible for testing with the guarantee strip raised, there is great interest in optically testing the closures before the guarantee strip is folded in. However, the raised guarantee strip forms an obstacle to the entry of the star wheel.

For the separation of the test objects by means of the star wheel, it is furthermore necessary that the test objects should rest on the conveyor belts in the same orientation at all times, namely with the bottom surface on the transport plane spanned by the conveyor belt. However, if a test object reaches the conveyor belt in an incorrect orientation, the finger cannot enter the test object via the upwardly open top surface, and high forces are exerted on the mounts of the star wheel. The high forces can damage the incorrectly oriented test object and lead to a deflection of the movably mounted star wheel. Owing to the high transport speed of the test objects in the transport direction and the duration of the return of the star wheel to the original position, subsequent test objects are not or not precisely spaced apart.

A further disadvantage of separation by means of the fingers entering the test objects with play consists in inaccurate positioning of the test objects.

Finally, the entry of the fingers of the star wheel may be undesirable for hygienic reasons in the case of certain test objects, for example in the case of container closures.

U.S. Pat. No. 4,044,891 A discloses a transport device having two transport chains for transporting cans through a testing or monitoring station. A wheel indexer is arranged at the entry to the test section and has two star wheels, which are driven synchronously in the same direction mechanically via a chain. In the event that cans accumulate at the entry to the testing and monitoring unit, the wheel indexer maintains the required spacing between the cans for subsequent testing.

DE 34 27 379 A1 discloses a device for dividing one row of objects into two rows, which has two mutually opposite, non-driven wheels. The circumference of the wheels is in each case profiled in such a way that the incoming objects come into engagement with this profile and are in each case alternately taken along by one of the two wheels rotating as a result of the feed motion of the objects and deflected to the right or left out of their feed direction. The objects deflected in this way are introduced into two separate outlet channels. Because the two wheels are mounted in a freely rotatable manner and are not driven, there is no damage even when the conveying device is at a standstill; if no objects are delivered or the objects accumulate on the outlet side, the two wheels simply remain stationary.

BRIEF SUMMARY OF THE INVENTION

Proceeding from this prior art, the problem underlying the invention is that of providing a separating device of a testing unit of the type mentioned at the outset for the non-destructive physical testing of test objects, in which damage to test objects is largely avoided and in which the positioning of the test objects during separation is more accurate.

Proceeding from this prior art, the problem underlying the invention is that of providing a separating device of a testing unit of the type mentioned at the outset, in which damage to test objects is largely avoided and in which the positioning of the test objects during separation is more accurate.

The solution to the problem provides two preferably matching, i.e. structurally identical, pocket wheels having a plurality of pockets distributed uniformly over the circumference. The two pocket wheels are made to rotate synchronously in opposite directions about preferably parallel axes by means of a drive. Extending between the two pocket wheels, in the transport plane of the continuous conveyor system, is an engagement section, in which the lateral surface of each test object comes into contact with in each case one pocket of the two pocket wheels. The introduction of force during separation does not take place in the region of the sensitive upper edge of the test object, but via the rotationally symmetrical, stable lateral surface, preferably in the vicinity of its bottom surface, by means of which each test object rests on the transport plane of the continuous conveyor system when oriented correctly.

Depending on the diameter and the height of the lateral surface of the test objects, the spacing of the pocket wheels from one another and from the transport plane must be determined in such a way that the individual test objects are each moved through the engagement section in a positively guided manner by two pockets of the two pocket wheels and are released from the two pockets downstream of the engagement section.

The testing unit has a control system for adjusting the speed of rotation of the two pocket wheels relative to the speed of each conveying means of the continuous conveyor system in such a way that the transport speed of the test objects in the accumulation and engagement section is lower than the transport speed of the test objects in the acceleration and transport section. After leaving the engagement section, the test objects accelerate in the acceleration section to the higher transport speed in the transport section adjoining the acceleration section. After acceleration, the test objects move in the transport section at the speed of the conveying means of the continuous conveyor system to which the test objects are transferred by the two pocket wheels downstream of the engagement section.

The continuous conveyor system can have one conveying means or a plurality of conveying means arranged in succession in the transport direction. The continuous conveyor system preferably has a belt conveyor and a flow conveyor.

At least the acceleration section and the transport section are arranged in succession in the transport direction in the transport plane of the belt conveyor. Preferably, at least a part of the accumulation section, the engagement section, the acceleration section and the transport section are arranged in succession in the transport direction in the transport plane of the belt conveyor. This arrangement makes it possible to integrate separation into the belt conveyor provided for the testing unit in the region of the digital cameras and to connect the belt conveyor to a further conveying means, for example an upstream sorter for the test objects. Modular separation of the individual assemblies of the testing unit can thereby be achieved.

The correctly oriented test objects are conveyed out of the sorter, in particular by means of compressed air. The continuous conveyor system can therefore additionally have a flow conveyor, wherein the further part of the accumulation section is situated in the transport plane of the flow conveyor.

In principle, however, it is also possible for at least the accumulation section and the engagement section to be arranged in succession in the transport direction in the transport plane of the flow conveyor. In this case, the belt conveyor takes over the test objects only after the engagement section. In the accumulation section and the engagement section, the test objects slide on a sliding surface that forms the transport plane.

The belt conveyor preferably has two conveyor belts circulating parallel to one another at the same speed, referred to as a double track belt. The surface of each conveyor belt of the belt conveyor transmits the driving forces by means of friction to the bottom surface of the test objects. Insofar as the belt conveyor forms part of the accumulation section, the coefficients of friction must be matched in such a way that the accumulated test objects in the accumulation section can slide over the surface of each conveyor belt without being damaged.

However, the belt conveyor can also have just one conveyor belt, round-section belt or other circulating support means which are suitable for transmitting the driving forces to the test objects by means of frictional forces. However, embodiment as a double track belt makes it possible in a particularly simple manner to design the belt conveyor as a vacuum belt conveyor, at least in some section or sections. Arranged between an upper and lower strand of the double track belt of the belt conveyor is a vacuum channel, which has a longitudinal slot that opens into the upper strand in the interspace of the double track belt and increases the contact pressure of the test objects on the surface of each conveyor belt.

By virtue of the increased contact pressure, the slip between the surface of each conveyor belt and the test objects and thus the acceleration section is shortened. The shortening contributes to a shorter overall length of the testing unit.

In addition, the vacuum stabilizes the position of the test objects on each conveyor belt of the belt conveyor in the transport section, which is not always guaranteed by gravity alone at the required high speeds of up to 100 test objects per second.

For the single-row transport of the test objects in a transport direction by means of the continuous conveyor system, lateral guides extending preferably in the transport direction are arranged parallel to one another above the transport plane in such a way that the lateral guides guide each test object on opposite sides of the lateral surface. The lateral guides in the accumulation section prevent individual test objects from escaping from the single-row delivery flow owing to the back pressure. The lateral guides extend at least along the accumulation section, but preferably via the engagement section into the acceleration section.

In order to be able to adapt the separating device to test objects with different diameters with little effort, the spacing between the lateral guides is adjustable in an advantageous embodiment of the invention.

In order to counteract tilting moments of the test objects in the acceleration section, the engagement section and parts of the accumulation section, in an advantageous embodiment of the invention an overhead guide is arranged above the transport plane of the continuous conveyor in such a way that the overhead guide guides the top surface of each test object. The belt speed of the belt conveyor, which is higher than the speed of the test objects in the accumulation and engagement section, is responsible for tilting moments in the accumulation and engagement section.

A tilting moment also continues to act on the test objects in the acceleration section owing to the inertia during acceleration. The overhead guide therefore preferably extends not only over a part of the accumulation section but also along the engagement section and, starting from the engagement section, at least partially along the acceleration section.

In order to adapt the overhead guide to test objects of different heights, the spacing between the overhead guide and the transport plane is adjustable. In order to adjust both the lateral and the overhead guides, mountings with different fastening positions can be provided for releasable connections between the guides and the mountings. Alternatively, the lateral and overhead guides can be fastened to lockable linear guides which permit manual or automatic adjustment of the spacing.

All the pockets of both pocket wheels are bounded by simply curved surfaces having a corresponding curvature. The lateral surface of each test object comes into contact with the curved surface of in each case one pocket of the two pocket wheels at the entry to the engagement section, as a result of which the build up in the accumulation section is produced. During the further transport of each test object in the accumulation section, the two pockets together form a nest in which the test object, enclosed by the two pockets, is moved through the engagement section before the pockets release the test object again at the end of the engagement section. There, each test object moves onto the double track belt of the belt conveyor and is accelerated to the speed of the belt conveyor in the subsequent acceleration section.

The transitions between adjacent pockets of the pocket wheels are preferably of rounded design. The rounding leads to a reduction in the height of the teeth between adjacent pockets and has the effect that the pocket wheels do not push the test objects back counter to the transport direction in the accumulation section when the test object which is at the front in the accumulation section comes into contact with the pockets of the two pocket wheels for the first time.

The pocket wheels are preferably arranged directly above the transport plane, thus ensuring that each test object comes into contact with the pockets near the bottom surface. In this area, the test objects are particularly stable and insensitive to damage. The thickness of the pocket wheels is selected in such a way that there is space for the lateral guides above the pocket wheels.

The drive which makes the pocket wheels rotate synchronously in opposite directions about the preferably parallel axes preferably comprises a servomotor. The servomotor allows precise control of the position of the pocket wheels. Furthermore, the servomotor ensures a constant rotational speed of the pocket wheels, even if the back pressure in the accumulation section changes. In addition, the servomotor can have torque limitation if the back pressure within the accumulation section assumes unacceptably high values. Finally, a servomotor makes it possible to control speed profiles which are required for the controlled start-up of the testing unit. In particular, the servomotor has an advantageous effect if the separating device is equipped with a control circuit that maintains an undisrupted accumulation section so that the test objects always bear against one another on their lateral surfaces immediately ahead of the engagement section.

The drive can have, for example, two drive shafts, rotatable about the parallel axes, for the two pocket wheels, which shafts are in each case connected for conjoint rotation to a gear wheel at the end opposite the pocket wheels. The output shaft of the servomotor has a drive gear wheel. Power transmission takes place via a toothed belt, which is guided via the drive gear wheel, the two gear wheels connected to the shafts and a deflection pulley arranged between the two gear wheels.

As a departure from the drive concept described above with one servomotor for driving both pocket wheels, it is also possible, however, to provide two servomotors, which drive the pocket wheels synchronously in opposite directions.

Moreover, the use of servomotors in the drive has an advantageous effect if the separating device is equipped with a control circuit that maintains an undisrupted accumulation section so that the test objects always bear against one another on their lateral surfaces immediately ahead of the engagement section.

In order to be able to transport test objects with different diameters along the engagement section within the limits of the pocket geometry without having to install pocket wheels with modified diameters, one embodiment of the invention provides that the spacing between the axes of the pocket wheels is adjustable. For this purpose, the bearings of the drive shafts for the pocket wheels can be movably mounted.

The speed of rotation of the pocket wheels is adjusted by means of the control system in such a way that between 10-100 test objects per second, typically about 60 test objects per second, leave the engagement section. The peripheral speed (U) and also the necessary rotational speed ($\omega$) can be calculated from the number of pockets (N) in the pocket wheels and the spacing (R) between the object axis of the test object and the axis of rotation of the pocket wheel.

$$U = \omega \cdot 2R \cdot \pi$$

$\omega$=rotational speed in 1/s
U=peripheral speed in m/s
R=spacing between object axis and axis of rotation of the pocket wheel in m
n=number of test objects/s Depending on the peripheral speed (U), the control system sets a speed of the belt conveyor which is greater than the peripheral speed. Insofar as a flow conveyor is additionally present, the speed of the flow medium is controlled in such a way that the transport speed of the test objects in the accumulation section without the accumulating pocket wheels is greater than the peripheral speed.

The speed difference between the peripheral speed (U), which corresponds to the transport speed of the test objects ($v_A$) in the accumulation section, and the speed of the belt conveyor ($v_B$) determines the spacing (D) between the test objects after separation:

$$n = v_A/A = v_B/B \text{ where } v_A = U$$

D=spacing between test objects in m, where D=B−A
U=peripheral speed in m/s
n=number of test objects/s
$v_A$=transport speed of test objects
   in accumulation section in m/s
$v_B$=speed of belt conveyor in m/s In an advantageous embodiment of the invention, the control system for adjusting the speed of rotation of the pocket wheels relative to the speed of each conveying means of the continuous conveyor system is part of a control circuit which ensures that an undisrupted accumulation section is maintained at least immediately ahead of the engagement section, so that test objects always bear against one another in a single row on their lateral surfaces there.

The accumulation section is monitored, by means of a sensor for example, for gaps in the transport flow of the test objects. Any gaps could lead to the test objects not being correctly received by the pockets of the two pocket wheels in the engagement section, but rather the tooth-like transitions between the pockets striking the lateral surfaces of subsequent test objects in the disrupted accumulation section and damaging them. If a gap is detected, the controller, for example as a countermeasure, can reduce the speed of rotation of the pocket wheels by means of the control, thus ensuring that the gap closes again.

The control circuit preferably keeps the speed difference between the speed of rotation of the pocket wheels and the peripheral speed (U) resulting therefrom and the speed of the belt conveyor constant, thus ensuring that the spacing (D) between the test objects does not change after separation, despite the reduction in the speed of rotation of the pocket wheels.

A constant spacing (D) can be achieved by a fixed ratio of the transport speed $v_A$ of the test objects in the accumulation section to the speed of the belt conveyor $v_B$:

$$D = A^*(v_B/v_A - 1) \text{ where } v_A = U$$

where

D=spacing between test objects in m
U=peripheral speed in m/s
$v_A$=transport speed of test objects in accumulation section in m/s
$v_B$=speed of belt conveyor in m/s
A=diameter of test object (closure cap) in m Maintenance of the constant spacing (D) by a fixed ratio of the transport speed $v_A$ of the test objects in the accumulation section to the speed of the belt conveyor $v_B$ is preferably likewise effected by the control circuit comprising the control system for adjusting the speed of rotation of the pocket wheels (3.1, 3.2) relative to the speed of each conveying means of the continuous conveyor system (2).

The invention is explained in greater detail below with reference to the drawings. In the drawings:

BRIEF DESCRIPTION OF THE DRAWINGS

The invention is explained in greater detail below with reference to the drawings. In the drawings:

FIG. 4 shows a block diagram of a control circuit for the separating device.

DETAILED DESCRIPTION OF THE PREFERRED EMBODIMENTS

The separating device is a component of a testing unit (not shown completely for the sake of clarity) for the optical testing of corresponding test objects (1) which are rotationally symmetrical with respect to an object axis (1.1). The test objects (1) are, for example, closure caps for beverage containers. The test objects, which are rotationally symmetrical with respect to an object axis (1.1), all correspond to one another. They have a bottom surface (1.2), a top surface (1.3) bounded by the upper edge of the test object, and a lateral surface (1.4) extending between the bottom surface (1.2) and the top surface (1.3). The separating device comprises a continuous conveyor system (2) with a transport plane (2.1) (cf. FIG. 1a). The test objects (1) are transported in a single row in a transport direction (2.2) in the transport plane (2.1).

The separating device further has two matching pocket wheels (3.1, 3.2), which are rotatable about axes (3.3) perpendicular to the transport plane (2.1). In the exemplary embodiment illustrated, the pocket wheels (3.1, 3.2) have ten pockets (3.4) distributed uniformly over the circumference. All the pockets (3.4) of both pocket wheels (3.1, 3.2) are bounded by simply curved surfaces having a corresponding curvature. The tooth-like transitions (3.5) between adjacent pockets (3.4) are greatly rounded.

Figure 3:
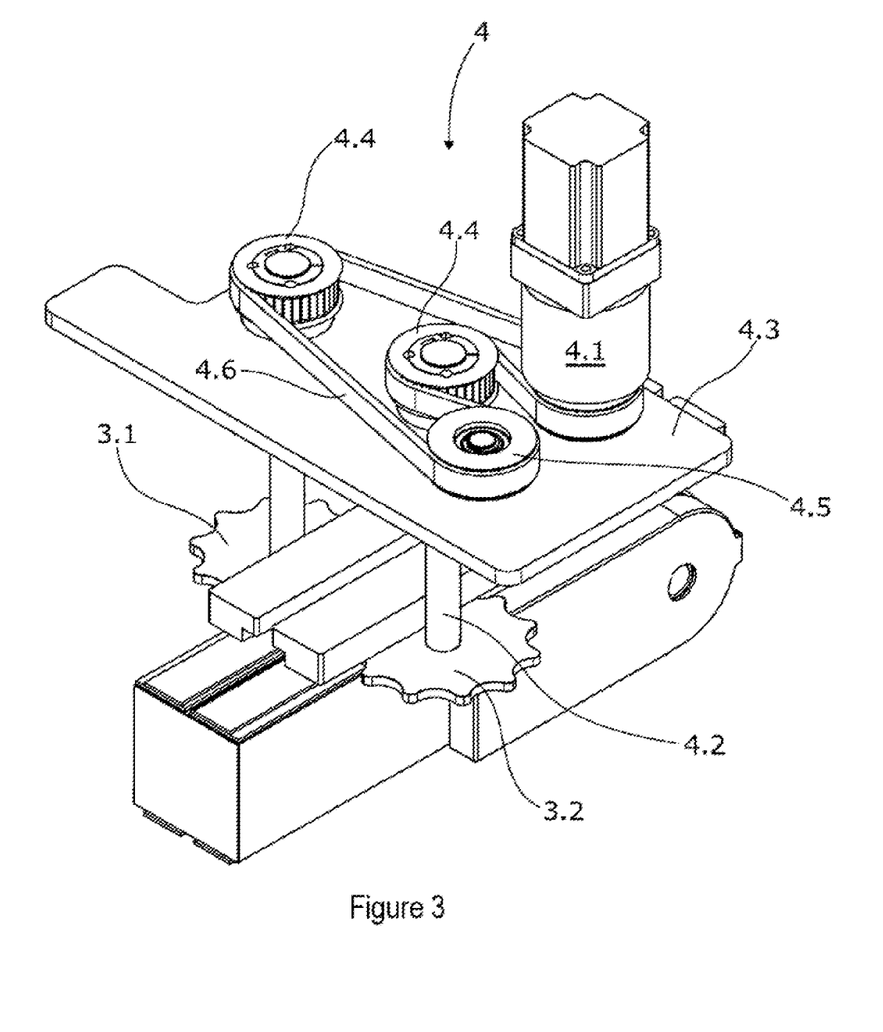
FIG. 3 shows a perspective view of the separating device with a drive according to an embodiment of the present invention.

A drive (4), which makes the pocket wheels (3.1, 3.2) rotate synchronously in opposite directions about the parallel axes (3.3), is illustrated in FIG. 3. The drive (4) comprises a servomotor (4.1) having a drive pinion. Connected to the pocket wheels (3.1, 3.2) for conjoint rotation therewith are drive shafts (4.2), which are mounted in a supporting structure (4.3) and are each connected to a gear wheel (4.4) at the ends opposite the pocket wheels (3.1, 3.2). Furthermore, a toothed deflection pulley (4.5) is rotatably mounted on the supporting structure (4.3). Via a toothed belt (4.6), the drive pinion of the servomotor (4.1) drives the gear wheels (4.4, 4.5), which make the drive shafts (4.2) and thus the pocket wheels (3.1, 3.2) rotate synchronously in opposite directions about the parallel axes (3.3, 3.4).

In the exemplary embodiment illustrated, the continuous conveyor system (2) of the separating device has on the input side a flow conveyor (5) which transfers the test objects (1) to a belt conveyor (6). The flow conveyor (5) conveys the test objects in the transport direction (2.2) on a sliding plate (5.1) by means of an air flow. Lateral guides (5.2) extending parallel to one another are arranged in the transport direction (2.2) above the transport plane (2.1) in such a way that the lateral guides (5.2) guide each test object (1) on opposite sides of the lateral surface (1.4). The flow conveyor (5) connects the separating device to an upstream sorting device (not shown), in which the test objects are transported by means of an air flow.

The test objects are transferred from the flow conveyor (5) to a belt conveyor (6), which, in the exemplary embodiment illustrated, has a circulating double track belt (6.1). The belt conveyor (6) comprises a supporting structure (6.2), a drive station (6.3) and a deflection station (not shown for the sake of clarity) for the two conveyor belts of the double track belt (6.1). The upper strand of the two conveyor belts of the double track belt (6.1), together with the sliding plate (5.1) of the flow conveyor (5), forms the transport plane (2.1) of the continuous conveyor system (2). The supporting structure (6.2) is designed as a closed channel, in which there is a vacuum. The vacuum acts on the bottom surfaces (1.2) of the test objects (1) via a longitudinal slot (6.5).

Two guide profiles (6.6) extend in the transport direction (2.2) above the transport plane (2.1) in the region of the conveyor belt conveyor (6). The guide profiles (6.6) each have a horizontal and a vertical section, wherein the two horizontal sections form an overhead guide (6.7) and the two vertical sections form the lateral guides (6.8) for the belt conveyor. The height of the guide profiles (6.6) and their spacing from one another are determined in such a way that the lateral guides (6.8) guide each test object (1) on opposite sides of the lateral surface (1.4), and the overhead guide (6.7) guides the top surface (1.3) of each test object (1).

Figure 1:
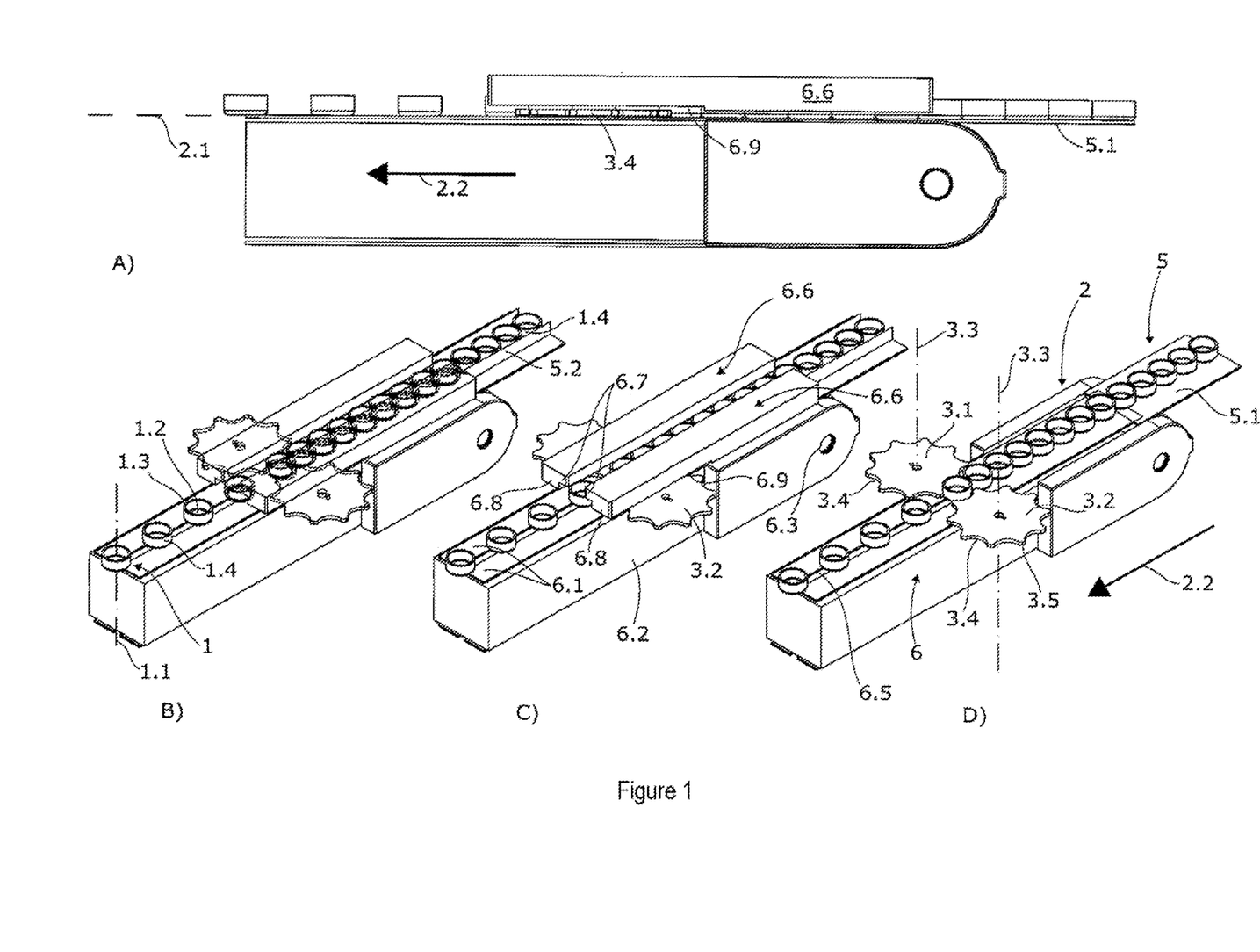
FIG. 1a shows a side view of a separating device without a drive according to an embodiment of the present invention.
FIG. 1b shows a perspective view of the separating device according to FIG. 1a with a transparent representation of the guide elements.
FIG. 1c shows a representation corresponding to FIG. 1b with guide elements.
FIG. 1d shows a representation corresponding to FIG. 1b with the guide elements removed.

As can be seen in particular from FIGS. 1a, 1b and 1c, the two guide profiles (6.6) each have, in the region of the pocket wheels (3.1, 3.2), a notch (6.9), through which the pocket wheels (3.1, 3.2) extend in the direction of the transport plane (2.1).

Figure 2:
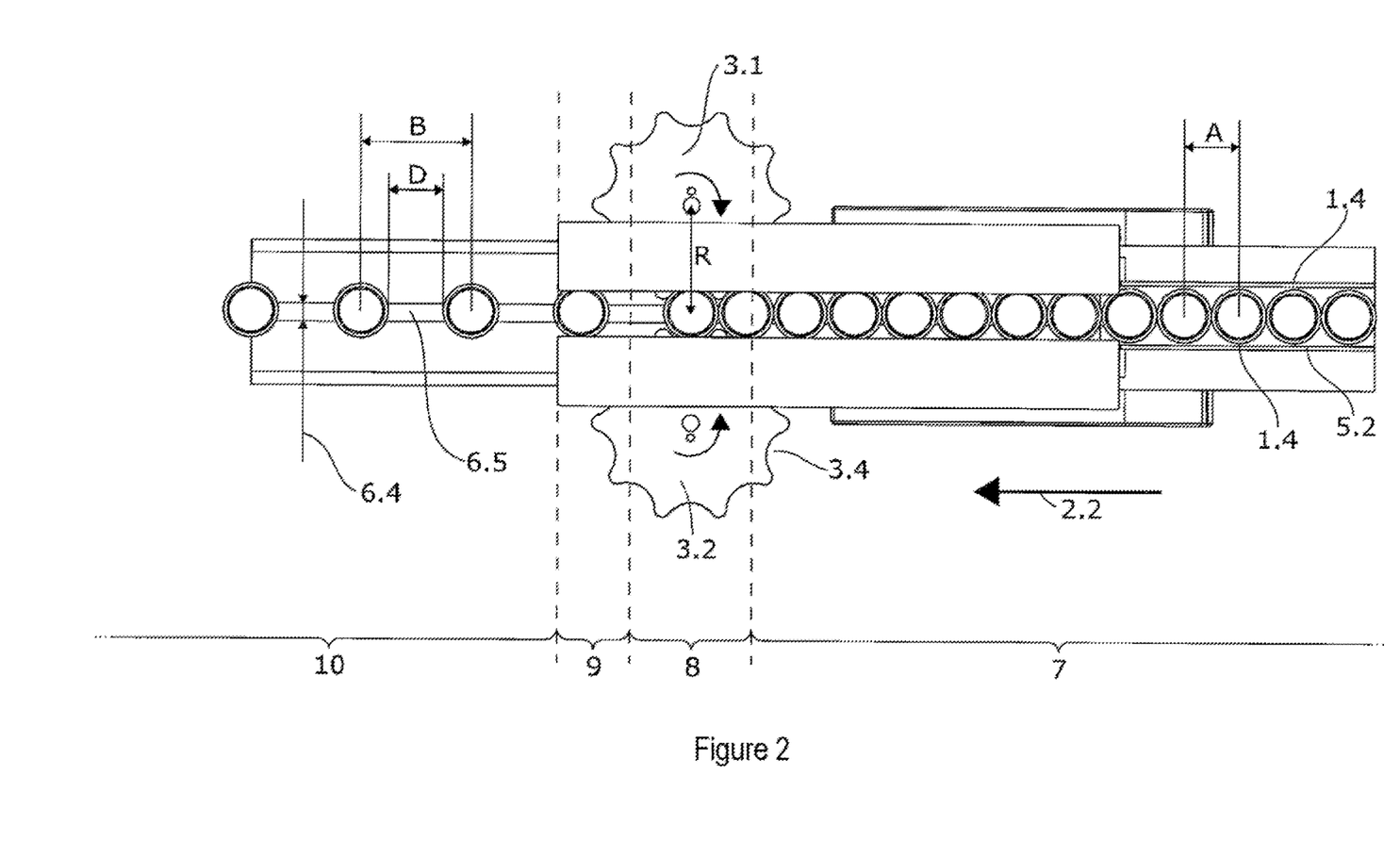
FIG. 2 shows a plan view of the separating device according to FIG. 1c.

It can be seen in the plan view according to FIG. 2 that an accumulation section (7), an engagement section (8), an acceleration section (9) and a transport section (10) are arranged in succession in the transport direction (2.2) in the transport plane (2.1) of the flow conveyor (5) and of the belt conveyor (6). The accumulation and transport sections (9, 10) are not shown completely.

In the accumulation section (7), the test objects (1) bear against one another in a single row at their lateral surfaces (1.4) with a corresponding spacing (A) between the object axes (1.1) of the test objects (1) corresponds. The accumulation section (7) serves to equalize the transport flow of the test objects (1) between the sorter and the optical test in terms of quantity and time, to which a constant number of test objects per time unit, for example 60 test objects per second, must be fed at a uniform spacing (A). Via the accumulation section (7), the test objects (1) are fed without gaps to the two pocket wheels (3.1, 3.2). The spacing between the parallel axes (3.3) of the pocket wheels (3.1, 3.2) and the vertical spacing of the pocket wheels (3.1, 3.2) from the transport plane (2.1) is determined in such a way that the lateral surface (1.4) of each test object (1) comes into contact with in each case one pocket (3.4) of the two pocket wheels (3.1, 3.2) in the engagement section (8). FIG. 1d shows how the two cooperating pockets (3.4) of the two pocket wheels (3.1, 3.2) form a nest surrounding the test object (1) at the lateral surface (1.4) in the course of the further rotation, and transport the test object (1) through the engagement section (8) and release this at the end of the engagement section.

FIG. 4 shows a control circuit comprising a control system (11) for adjusting the speed of rotation of the pocket wheels (3.1, 3.2) relative to the speed (vB) of the belt conveyor (6) in such a way that the transport speed (vA) of the test objects (1) in the accumulation and engagement section (7, 8) is lower than the speed (vB) of the belt conveyor (6) which corresponds to the transport speed of the test objects (1) in the transport section (10). The transport speed (vA) of the test objects (1) in the accumulation and engagement section (7, 8) corresponds to the peripheral speed (U) of each test object (1) resulting from the speed of rotation of the pocket wheels (3.1, 3.2). In the exemplary embodiment illustrated, the speed of rotation of the pocket wheels is controlled by means of the servomotor (4.1) of the drive (4) and the speed of the belt conveyor (6) is controlled by means of the drive station (6.3).

Both the air flow of the flow conveyor (5) and the frictional forces exerted on the bottom surfaces (1.2) of the test objects (1) via the double track belt (6.1) of the belt conveyor (6) generate a back pressure in the accumulation section (7). The pocket wheels (3.1, 3.2) rotating at a controlled speed of rotation prevent the test objects (1) in the accumulation section (7) and the engagement section (8) from unimpeded transport at the higher speed of the belt conveyor and of the air flow until they are released at the end of the engagement section (8) by virtue of the rotation of the pocket wheels (3.1, 3.2) and are accelerated in the acceleration section (9) to the speed ($v_B$) of the belt conveyor (6).

The number (n) of test objects separated per unit of time depends on the number of pockets in the pocket wheels (3.1, 3.2) and on the speed of rotation of the pocket wheels. However, the spacing (B) between the test objects (1) after separation depends on the speed difference between the transport speed ($v_A$) in the accumulation section (7) and the speed ($v_B$) of the belt conveyor in the transport section.

In order to stabilize the position of the test objects (1) on the transport section (10) and to shorten the acceleration section (9), the longitudinal slot (6.5) via which a vacuum acts on the bottom surface (1.2) of the test objects (1) extends from the engagement section (8), via the acceleration section (9), to the transport section (10). However, no vacuum is effective in the accumulation section (7) because it would impair the accumulation of the test objects. The effect of the vacuum can also be dispensed with in the engagement section (8). Vacuum support is useful for test objects with a closed or at least partially closed bottom surface.

The surface of the double track belt (6.1) of the belt conveyor (6) has a coefficient of friction which is matched to the requirement of an accumulation section (7) and which allows the test objects (1) in the accumulation section to slide over the surface.

In one advantageous embodiment of the invention, the accumulation section (7) is monitored by means of a sensor (12) for any gaps in the transport flow. Any gaps can lead to the test objects not being correctly received by the pockets (3.4) of the two pocket wheels (3.1, 3.2), with the transitions (3.5) instead striking the lateral surfaces (1.4) of following test objects (1). If a gap is detected, it is possible, for example as a countermeasure, for the speed of rotation of the pocket wheels (3.1, 3.2) to be reduced to ensure that the gap closes again.

| No | Designation |
|---|---|
| 1 | Test objects |
| 1.1 | Object axis |
| 1.2 | Bottom surface |
| 1.3 | Top surface |
| 1.4 | Lateral surface |
| 2 | Continuous conveyor system |
| 2.1 | Transport plane |
| 2.2 | Transport direction |
| 3.1 | Pocket wheel |
| 3.2 | Pocket wheel |
| 3.3 | Axis |
| 3.4 | Pocket |
| 3.5 | Transitions |
| 4. | Drive |
| 4.1 | Servomotor |
| 4.2 | Drive shafts |
| 4.3 | Supporting structure |
| 4.4 | Gear wheel |
| 4.5 | Deflection pulley |
| 4.6 | Toothed belt |
| 5 | Flow conveyor |
| 5.1 | Sliding plate |
| 5.2 | Lateral guide |
| 6 | Belt conveyor |
| 6.1 | Double track belt |
| 6.2 | Supporting structure |
| 6.3 | Drive station |
| 6.4 | Spacing |
| 6.5 | Longitudinal slot |
| 6.6 | Guide profile |
| 6.7 | Overhead guide |
| 6.8 | Lateral guides |
| 6.9 | Notch |
| 7 | Accumulation section |
| 8 | Engagement section |
| 9 | Acceleration section |
| 10 | Transport section |
| 11 | Control system |
| 12 | Sensor |

The invention claimed is:

1. A separating device for separating test objects in a testing unit for the nondestructive and physical testing of the test objects, each of the test objects being rotationally symmetrical with respect to an object axis and having a bottom surface, a top surface, and a lateral surface extending between the bottom surface and the top surface, the separating device comprising:

a continuous conveyor system having at least one conveyor configured to transport the test objects in a single row in a transport direction and in a transport plane, the continuous conveyor system having an accumulation section, an engagement section, an acceleration section, and a transport section arranged in succession in the transport direction in the transport plane;

two pocket wheels, each having a plurality of pockets distributed uniformly over a circumference, the two pocket wheels are rotatable about respective axes;

a drive rotating the two pocket wheels synchronously in opposite directions about the respective axes;

wherein the engagement section extends between the two pocket wheels and a spacing between the axes of the pocket wheels and a spacing of the pocket wheels from the transport plane are determined so that the lateral surface of each of the test objects contacts one pocket of each of the two pocket wheels when the each of the test objects in the engagement section;

a control system adjusting a speed of rotation of the pocket wheels relative to a speed of the at least one conveyor, wherein a transport speed of the test objects in the accumulation section and the engagement section is lower than a transport speed of the test objects in the acceleration section and the transport section;

wherein the control system is part of a control loop that ensures that the accumulation section immediately upstream of the engagement section is maintained in an undisrupted state; and a sensor monitoring the accumulation section for gaps between the test objects, wherein the control system reduces the rotational speed of the pocket wheels as a countermeasure when a gap is detected.

2. The separating device as claimed in claim 1, wherein the at least one conveyor of the continuous conveyor system includes a belt conveyor moving the test objects in at least the acceleration section and the transport section.

3. The separating device as claimed in claim 1, wherein the at least one conveyor of the continuous conveyor system includes a belt conveyor moving the test objects in at least a first part of the accumulation section, the engagement section, the acceleration section, and the transport section.

4. The separating device as claimed in claim 2, wherein the continuous conveyor system further includes a flow conveyor moving the test objects in the accumulation section and the engagement section.

5. The separating device as claimed in claim 3, wherein the continuous conveyor system further includes a flow conveyor moving the test objects in at least a second part of the accumulation section.

6. The separating device as claimed in claim 2, wherein the belt conveyor includes a double track belt.

7. The separating device as claimed in claim 1, further comprising lateral guides extending in the transport direction and arranged parallel to one another above the transport plane, the lateral guides guide each of the test objects on opposing sides of the lateral surface of the each of the test objects.

8. The separating device as claimed in claim 7, wherein the lateral guides extend at least along the accumulation section.

9. The separating device as claimed in claim 7, wherein the lateral guides are arranged along the engagement section above the pocket wheels.

10. The separating device as claimed in claim 7, wherein a spacing between the lateral guides is adjustable.

11. The separating device as claimed in claim 1, further comprising an overhead guide arranged above the transport plane guiding the top surface of each of the test objects.

12. The separating device as claimed in claim 11, wherein the overhead guide extends along the engagement section and at least partially along the acceleration section.

13. The separating device as claimed in claim 11, wherein a spacing between the overhead guide and the transport plane is adjustable.

14. The separating device as claimed in claim 2, wherein at least a section of the belt conveyor is a vacuum belt conveyor.

15. The separating device as claimed in claim 1, wherein the pockets of each of the pocket wheels are bounded by simply curved surfaces having a corresponding curvature.

16. The separating device as claimed in claim 1, wherein the drive comprises a servomotor.

17. The separating device as claimed in claim 1, wherein a spacing between the axes of the pocket wheels is adjustable.

18. The separating device as claimed in claim 1, wherein the pocket wheels are identical and the axes of the two pocket wheels extend parallel to each other and perpendicular to the transport plane.

* * * * *